United States Patent
Carstensen et al.

(10) Patent No.: US 7,119,930 B1
(45) Date of Patent: Oct. 10, 2006

(54) APPARATUS AND A METHOD OF RECORDING AN IMAGE OF AN OBJECT

(75) Inventors: Jens M. Carstensen, Bjaeverskov (DK); Jørgen Folm-Hansen, Dannemare (DK)

(73) Assignee: Videometer ApS, Horsholm (DK)

( * ) Notice: Subject to any disclaimer, the term of this patent is extended or adjusted under 35 U.S.C. 154(b) by 0 days.

(21) Appl. No.: 09/601,739

(22) PCT Filed: Feb. 8, 1999

(86) PCT No.: PCT/DK99/00058

§ 371 (c)(1),
(2), (4) Date: Sep. 18, 2000

(87) PCT Pub. No.: WO99/42900

PCT Pub. Date: Aug. 26, 1999

(30) Foreign Application Priority Data

Feb. 6, 1998 (DK) .................................. 00171/98

(51) Int. Cl.
*H04N 1/04* (2006.01)
(52) U.S. Cl. ............... 358/474; 358/504; 358/906; 348/370; 250/201.3; 356/402
(58) Field of Classification Search ............ 358/474, 358/504, 505, 509, 406, 530, 513, 906, 909.1, 358/473, 475; 348/370, 371; 250/201.3; 356/402, 421
See application file for complete search history.

(56) References Cited

U.S. PATENT DOCUMENTS

| | | | | |
|---|---|---|---|---|
| 5,453,849 A | * | 9/1995 | Copenhaver et al. | 358/475 |
| 5,790,281 A | * | 8/1998 | Knox | 358/504 |
| 6,029,115 A | * | 2/2000 | Tracy | 702/22 |

* cited by examiner

*Primary Examiner*—Kimberly Williams
*Assistant Examiner*—Negussie Worku

(74) *Attorney, Agent, or Firm*—Dykema Gossett PLLC

(57) ABSTRACT

The invention relates to a method of recording an image of an object (103) using an electronic camera (102), one or more light sources (104), and means for light distribution (105), where light emitted from the light sources (104) is distributed to illuminate the object (103), light being reflected to the camera (102). In the light distribution, an integrating cavity (106) is used to whose inner side (107) a light reflecting coating has been applied, and which is provided with first and second openings (109, 110). The camera (102) is placed in alignment with the first opening (109) so that the optical axis of the camera extends through the first and second openings (109, 110). The object (103) is received in the second opening (110), and the interior of the integrating cavity is illuminated using the one or more light sources (104). The invention also relates to an apparatus for performing the method.

16 Claims, 3 Drawing Sheets

APPARATUS AND A METHOD OF RECORDING AN IMAGE OF AN OBJECT

Figure 1:
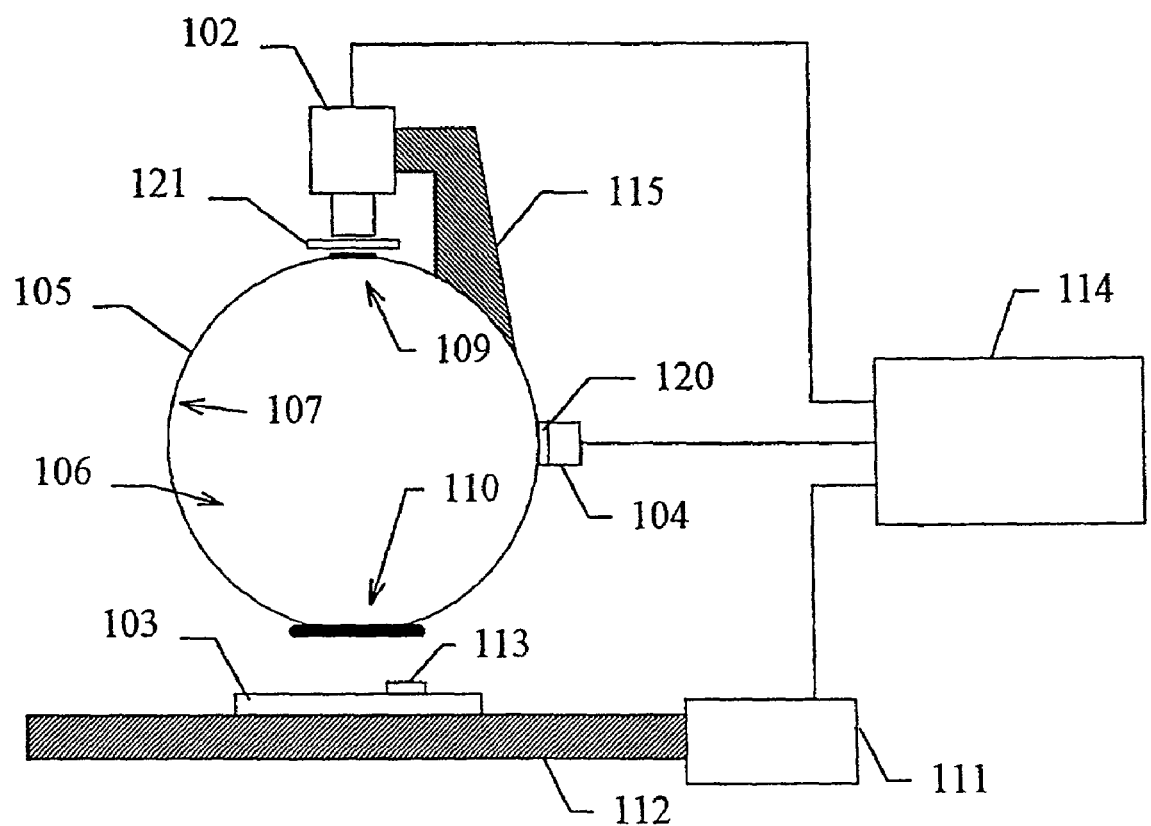

The invention relates to an apparatus for recording an image of an object, said apparatus comprising an electronic camera, one or more light sources, and means for light distribution adapted to distribute light emitted from the light source and hereby to illuminate the object, light being reflected to the camera. The invention also relates to a method of recording an image of an object.

According to the prior art it is known to record an image of an object by using an electronic camera, such as a video camera, and by using one or more light sources which are used for illuminating the object. In connection with the use of light sources, it is likewise known to use means for light distribution so that light emitted from the light source is distributed to achieve a given light distribution when the object is illuminated.

For example, it is known to record an image of an object by using a video camera and hereby achieve a reproduction of the spatial distribution of spectral components in a large number of points in the image. The spectral components reflect e.g. colour and intensity in the individual image point. It is noted that, for convenience, wavelengths in as well as out of the visible wavelength range of the human eye are just called colours below.

On the basis of the images recorded it is desirable to extract information on objects of which images have been formed, through analyses of the visual properties of the objects. Such analyses may e.g. include an analysis of the colour in selected image points or an analysis of texture, i.e. colour variations, in selected regions in recorded images.

Analysis of objects using such a prior art apparatus, however, has the limitation of setting bounds to how small differences in shade can be registered and how well they can be traced to known colour references. This results in a restriction in the possible uses of these apparatuses. When recording images within a limited wavelength range, e.g. illumination variations are critical. This results in measurement unreliability and makes the reproduction of image recordings difficult and at worst impossible. This means that prior art apparatuses in many cases cannot be used in connection with analysis of objects.

From the prior art, it is known to use an apparatus of the above-mentioned type, wherein the means for light distribution comprise an integrating cavity to whose inner side a reflecting coating has been applied, said integrating cavity being provided with first and second openings, the camera is placed in alignment with the first opening so that the optical axis of the camera extends through the first and second openings, the second opening is adapted to receive the object, and that the one or more light sources are mounted so as to illuminate the interior of the integrating cavity.

For example, U.S. Pat. No. 5,519,513 A shows an apparatus of this type.

An object of the invention is to provide an apparatus for recording images of objects, where the recorded images have well-specified and constant spectral properties over the entire image field. Another object is to provide an apparatus for recording images having a high spectral resolution.

This object is achieved according to the invention by an apparatus of the above-mentioned type, characterized in that said apparatus further is arranged to perform a calibration using one or more calibration objects having known visual properties which are placed in the field of vision of the camera.

Such an apparatus provides a well-defined homogeneous and diffuse illumination which brings out shades of colour rather than topographical nuances—variations in the surface of the object—and allows the camera to record images having well-specified constant spectral properties over the entire image field. This means that information on colours and thereby on texture may be extracted from the images with a much higher quality and even for objects for which this has not been possible before.

According to the invention, calibration of the apparatus may be carried out.

Hereby a homogeneous sensitivity over the entire image field for all spectral bands, and a transformation of pixel values to the desired spectral co-ordinates can be achieved. It is additionally ensured that analyses performed on the basis of this are reproducible.

In expedient embodiments, one or more of the calibration objects are constructed for use in spectral and geometrical calibration of the apparatus.

In an expedient embodiment, one or more calibration objects are positioned on the same or approximately the same plane as the object. This gives the advantage that the calibration of the apparatus is performed in the plane in which the object is positioned.

An expedient embodiment of an apparatus according to the invention is characterized in that the integrating cavity is symmetrical about a first axis, and that the camera is placed such that the optical axis of the camera coincides or at least approximately coincides with the first axis. In another expedient embodiment the integrating cavity is ball-shaped.

In an expedient embodiment, one or more of the light sources are placed at the integrating cavity so that the light sources emit light directly into the integrating cavity. A particularly simple structure of the apparatus is achieved hereby.

In an advantageous embodiment, one or more of the light sources are placed outside the integrating cavity and light is passed into the integrating cavity via light guides. This results in reduced heating of the integrating cavity because of emitted power from the light sources. Collected positioning of the light sources outside the integrating cavity moreover allows central spectral calibration of the light sources.

In an expedient embodiment, the camera is adapted to supply a representation of recorded images to a calculating unit, and the calculating unit is adapted to perform calculations on the basis of one or more of the representations. It is ensured hereby that an image analysis may be performed, and that information on the object may be extracted by using the calculating unit.

In an expedient embodiment, the camera is fixed relative to the integrating cavity. This provides a well-defined spacing between the camera and the second opening and hereby a well-defined focal plane.

In an expedient embodiment, the apparatus comprises a carrier plane on which the object may be placed, and the integrating cavity and the carrier plane are arranged movably relative to each other. This ensures that the object may easily be inserted into the apparatus.

Additional expedient embodiments of an apparatus according to the invention are defined in claims 12 to 14.

As mentioned, the invention also relates to a method of recording an image of an object using an electronic camera, one or more light sources, and means for light distribution, wherein light emitted from the one or more light sources is distributed to illuminate the object, light being reflected to the camera.

The method according to the invention is characterized by using, in the light distribution, an integrating cavity to whose inner side a light reflecting coating has been applied, and which is provided with first and second openings, positioning the camera in alignment with the first opening so that the optical axis of the camera extends through the first and second openings, receiving the object in the second opening, and illuminating the interior of the integrating cavity using the one or more light sources. The advantages mentioned in connection with the corresponding apparatus according to the invention are achieved hereby.

Expedient embodiments of a method according to the invention are defined in claims 16 to 21.

Figure 2:
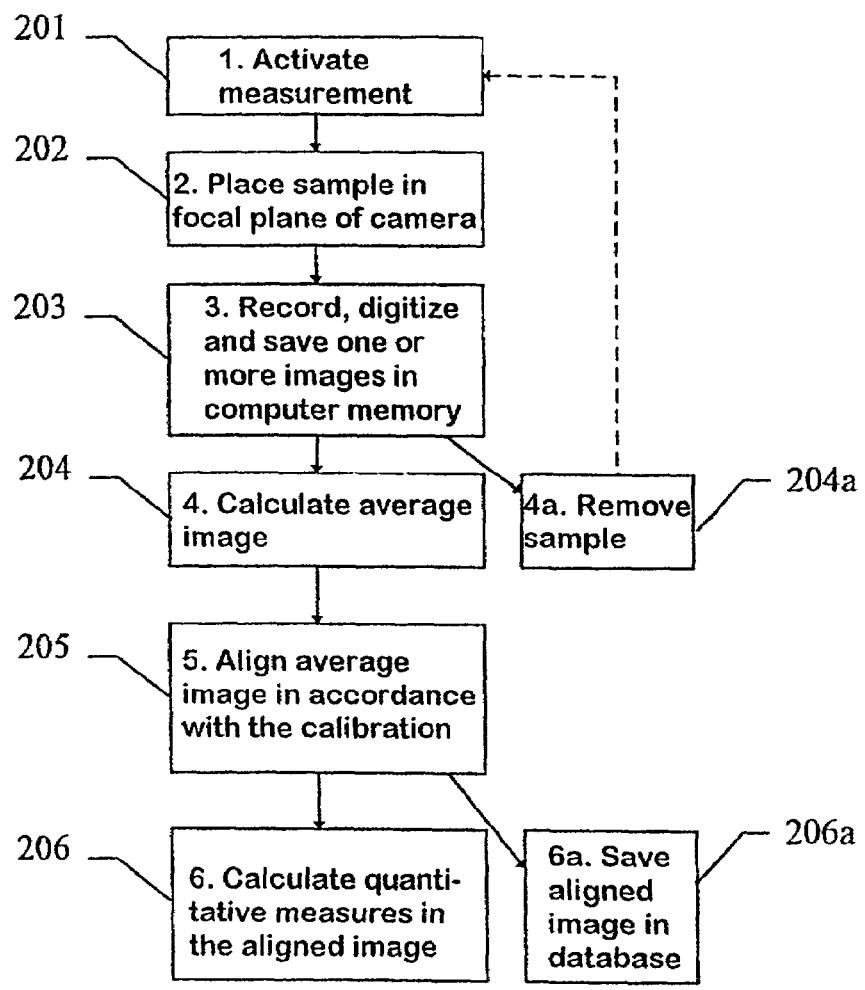
Figure 3:
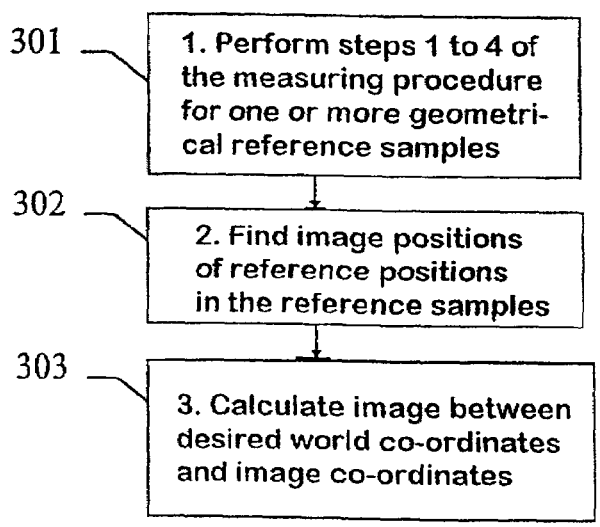
Figure 4:
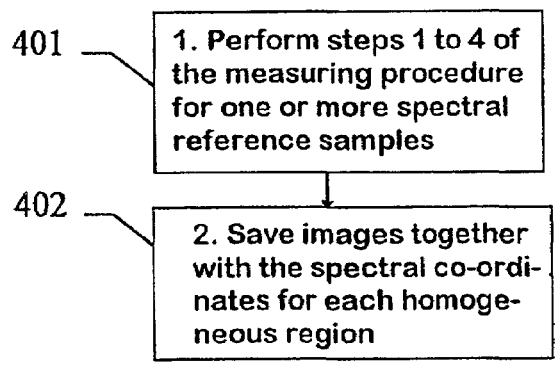
Figure 5:
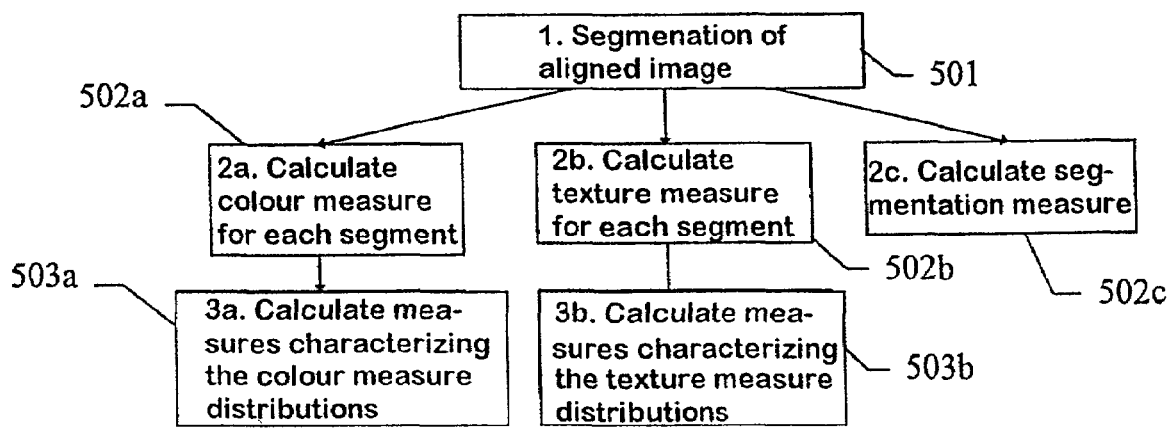

The invention will now be described more fully below with reference to the drawing, in which FIG. 1 illustrates an apparatus according to the invention, FIG. 2 shows stages in an image recording, FIG. 3 illustrates geometrical calibration of an apparatus according to the invention, FIG. 4 illustrates a spectral calibration of an apparatus according to the invention, and FIG. 5 shows examples of the determination of qualitative measures in a recorded image.

The figures are schematic and simplified for clarity, and they just show details which are essential to the understanding of the invention, while other details are left out. Throughout, the same reference numerals are used for identical or corresponding parts.

FIG. 1 shows an example of an apparatus according to the invention. The apparatus 102, which is adapted to record images of an object 103, comprises an electronic camera 102, such as a video camera, and a light source 104. The light source 104 is connected to means for light distribution which, in the embodiment shown, are formed by a ball 105 having a ball-shaped integrating cavity 106, whose inner walls are called the inner side 107 of the ball below. The object 103 is placed on a carrier plane 112 which is movably arranged relative to the ball 105 and the camera 102. The camera 102 is placed at a first opening 109 in the ball 105, and the object may be received in a second opening 110 of the ball 105 by movement of the carrier plane 112. It is noted that the apparatus also comprises a motor 111, which is connected to the carrier plane 112, and which is adapted to perform the movement of the carrier plane 112 and thereby of the object 103. The apparatus 101 additionally comprises a computer 114 which is adapted to control the image recording. The computer is connected to the camera 102, to the light source 104 and to the motor 111.

A dull light-reflecting coating has been applied to the inner side 107 of the ball, causing light emitted from the light source 104 to be distributed so as to achieve a diffuse and homogeneous illumination in the ball 105. It is noted that the ball 105, which is also called the integrating ball below, is expediently formed of a dimensionally stable material, such as carbon fibre provided with a gel coat on the inner side to which a white diffusing paint has been applied. This paint may e.g. be based on barium sulphate.

The first and second openings 109, 110 of the ball are called camera port and view port, respectively, below. The view port 110 is adapted to receive an object 103. The camera 102 is placed at the camera port 109 so that it can record images of the object 103 through the mentioned two ports 109, 110. As shown in the figure, this is achieved by placing the camera 102 so that its optical axis extends through both the camera port 109 and the view port 110. The camera port 109 is expediently relatively small, and the view port 110 is expediently adapted to the desired object size. The ratio of the view port diameter to the diameter of the ball-shaped cavity 106 must be kept as small as is practically possible to achieve the best possible illumination in the ball. The ball 105 makes it possible to achieve an even diffuse illumination or at least an approximately even diffuse illumination of the view port 110. Reflections from the view port 110 (self-illumination) and thereby an illumination which depends on the measuring object 103, are an effect which cannot be removed generally, but can be compensated optically or digitally.

The distance between the ball 105 and the lens of the camera is selected so great that direct light from the light source 104 does not fall on the lens glass. The lens is adjusted for focus in an area around the view port plane 110. Any camera may be used, be it analogue/digital, colour/monochrome. A CCD camera, e.g., may be involved.

The lamp of the light source 104 is selected on the basis of the desired illumination intensity and spectral power distribution. The light is passed either directly into the ball 105, i.e. the lamp is positioned directly on the ball, or via light guides. Light sources 104 may be positioned with the sole restriction that direct illumination of the view port 110 is to be avoided. The latter may optionally be ensured by arranging screens in the ball 105 around the light source. This provides the additional advantage that direct illumination of the camera port 109 is avoided. This screening of the light sources is not illustrated in the figure, as it may be carried out using known screens.

The motor 111, which is controlled by the computer, ensures that the object is placed in the view port 110, either by moving the base up and down like a piston and/or by moving the camera and the ball up and down. The carrier plane or the base is formed as a plane face, but may e.g. also have the following functions:

Fixation of measuring object both laterally and relatively to the focal plane, i.e. in the height.

Optical background for the measuring object. May be controlled, and calibration objects and/or calibration colours may optionally be put in. Another possibility is to compensate for self-illumination.

Automatization or merely handiness by allowing the base to move laterally inwards below the ball to a carriage stop, recording the image and then allowing the base to drive on or out again.

The motor 111 thus provides for the movement of the integrating cavity 106 relative to the carrier plane 112, partly for placing the object 113 or the sample in the view port, which allows measurement of many samples placed on the carrier plane. In this connection the carrier plane may be divided into cells. In the general case, the motor 111 must therefore provide for an xyz movement. However, the motor may be omitted completely, if the sample is moved to or past the view port by other means.

In the embodiment shown, the camera 102 is fixed relative to the integrating cavity 106. This is expedient, as it allows fixing of the second opening of the ball and thereby of the focal plane relative to the camera. This fixing is performed e.g. as shown in FIG. 1 by securing the camera 102 to the ball 105 using a fixing arm 115.

Calibration objects 113 having two types of information are used for the calibration of the apparatus 101. Partly a calibration object of known geometry, such as dots with a given mutual size and position, partly two or more known colours, such as black and white (an example of this is the NCS colours S-9000-N and S-0500-N). It is noted that the concept colour is used as a synonym for spectral components and must therefore be interpreted broadly, as, in this connection, no distinction is made between colours inside or outside the human visible wavelength area.

The computer 114 activates the motor 111 so that the object 103 is placed in the view port 110. Then the computer 114 records one or more images of the object using the camera 102 and then removes the object 103 from the view port 110 by activating the motor 111 again. The computer 114 hereby receives a digital video sequence from the camera 102. It is noted that it is not decisive whether the digitization of the video signal is performed in the camera 102 or in the computer 114. Further, a foot pedal or similar activation unit for the computer may be provided, making it easy for the user to operate the apparatus.

The computer 114 is adapted to control the entire measuring session and has a user interface which makes operation easy. Spectral as well as geometrical calibration is performed, and then application-dependent summing calculations are made, e.g. analysis of wavelength spectrum, shape and texture. The results and calibrated images are displayed directly on a screen associated with the computer and/or are saved in a suitable digital form in a storage associated with the computer. The apparatus 101 may be used in connection with multi-spectral image recording using e.g. a monochrome progressive scan camera and current switching between illumination of different wavelength. A first filter wheel 120 having e.g. 10 different filters is arranged in connection with the light source 104. The light is passed through the filter and via a light guide into the ball, and the filter used may currently be changed by turning the filter wheel 120. The filter wheel 120 triggers the camera 102 and the computer 114 at the same time, so that e.g. an image is recorded for each new filter. Hereby, e.g. 30 spectral images may be recorded in 1 second. This may also be implemented as a corresponding solution by replacing the filter wheel 120 by light emitting diodes of different colours and optionally by passing the light directly into the ball. In this case, it could be the camera 103 that controls the timing. Filters having a flat spectral transmission, which filter a given percentage of the light, may also be used, e.g. for recording images of different dynamic regions.

Both solutions may be combined with the option of fluorescence. In this case a filter 121 must be interposed between the camera port 109 and the lens of the camera, said filter being adapted to filter the excitation light. This filter may e.g. be a second filter wheel 121 which is controlled by the first filter wheel 120, with the first filter wheel 120 serving as a timing master.

The measuring procedure is shown in FIG. 2. After activation of the measurement (step 201) the sample is placed in the focal plane of the camera (step 202) which is typically disposed around the view port. These two first steps may be performed simultaneously or in reverse order in some applications. If it takes place in the order stated here, the apparatus itself can activate implementation of step 2. In step 3, one or more images are recorded using the camera 202, and a representation of these images is transferred to the computer 114 and stored in its memory. Then the sample may be removed (step 204a), and preparations may be made for the next sample, proceeding to step 201. As illustrated in step 204, pixelwise smoothing may be performed in cases where several images have been recorded. This might e.g. be a simple average formation of the images for each pixel, but also more robust smoothing methods such as median or trimmed average may be used. Where colour or multi-spectral measurement is involved, this smoothing is performed for each band. The resulting average image is now aligned in accordance with the calibration, step 205. It is noted that the calibration will be described more fully in connection with FIGS. 3 and 4. This takes place by geometrical alignment, which may be followed by spectral alignment or conversely. The aligned images may be saved in a database (206a), and a number of quantitative measurements may be calculated from the images (step 206), which will be described more fully in connection with FIG. 5. The quantitative measures may be saved together with the images in the database.

FIG. 3 illustrates a geometrical calibration of the apparatus 101. The calibration objects 113, which are used as geometrical reference samples, are faces or objects with a plurality of reference positions having a well-defined relative mutual positioning. For example, it is possible to use a sheet with a plurality of black dots with a known mutual size and position, e.g. positioned in a rectangular matrix structure with known distances. The centres of the dots may hereby be used as reference positions and hereby be used for performing geometrical calibration of the apparatus to eliminate geometrical errors in the images and introduce a desired metric in the image field.

The geometrical calibration is initiated, as indicated in step 301, by performing steps 201 to 204 of the measuring procedure (see FIG. 2) for generating average images of one or more geometrical reference samples. Then the reference positions are located in the images (step 302), and each reference position is given a desired position (or co-ordinate) in the aligned image. That is an image position and a desired position for each reference position are obtained. The relation between image positions and desired positions may be modelled e.g. by means of ordinary regression methods of least squares or interpolation (step 303). The parameters for the fitted model are saved and used for the geometrical alignment. For color or multispectral measurements the geometrical calibration is performed for each band. For geometrical calibration of the individual band it may be expedient in some cases just to use a subset of the reference positions.

FIG. 4 illustrates a spectral calibration of the apparatus 101. The calibration objects 113, which are used as spectral reference samples, are faces or objects containing one or more areas with spatial homogeneous spectral distribution by reflection. Each area must be associated with one or more spectral co-ordinates which describe relevant properties of the spectral distribution. Typically, the reference samples might be uniformly coloured reference sheets from a colour standard such as NCS. The spectral co-ordinates would then naturally be the NCS coordinates of the reference sheet.

The spectral calibration is intended to provide a homogeneous sensitivity over the entire image field for all bands and a transformation of pixel values to the desired spectral co-ordinates. Step 401 illustrates that the spectral calibration comprises first using steps 1 to 4 of the measuring procedure for generating average images of one or more spectral reference samples with known spectral co-ordinates for each area. Each pixel with known spectral co-ordinates may now either be saved with their position in the form of spectral calibration images, or averages (or robust variants thereof) of all pixels having the same spectral co-ordinates may be formed, useful for modelling the relation between (multispectral) pixel value and spectral co-ordinates (step 402). The first category forms the basis for the modelling of the relation between pixel value and spectral co-ordinate for the given pixels, and the second category forms the basis for the modelling of the relation between pixel value and spectral co-ordinate in general. Typically, it will be expedient to use two or more completely homogeneous sheets for the first category, to spectrally align images used for the second category, and then to fit the model from the second category. Modelling of the relation may take place by standard methods for both categories, such as regression of least squares, interpolation and/or extrapolation.

It is noted that the image alignment in step 205 in figure 2 takes place by making a geometrical alignment based on the geometrical calibration and a spectral alignment based on the spectral calibration.

The geometrical alignment takes place by generating, for each band in the image, an aligned image on the basis of the average image and the fitted geometrical model. This takes place by generally known methods within geometrical alignment and resampling.

The spectral alignment takes place by first using the pixel-wise spectral calibration (first category) and then the general spectral calibration (second category). This takes place by using the fitted models. Then pixel values in the spectral system of co-ordinates are represented.

In step 206 in FIG. 2, one or more quantitative measures in the aligned image may be calculated. A number of possible measurements are outlined in FIG. 5.

In the first instance, segmentation of the image may be performed, step 501. The segments define subsets of pixels on which the calculation is to be performed. A simple example might be a pre-defined rectangle within the field of vision which serves as a region of interest. A segment might also be defined by the amount of pixels with spectral co-ordinates within a specific region of the spectral system of co-ordinates. Generally, any segmentation method may be used. The number of segments, size distribution, form factor distributions and spatial distribution parameters for the segments themselves may be relevant quantitative measures, such as so-called segmentation measures. One or more qualitative measures may be determined on the basis of the segmentation, as indicated in steps 502a, 502b and 502c. The user may e.g. determine which of these steps is performed.

Colour measures are calculated on each segment (step 502a), and measures characterizing the colour measure distributions are calculated on the basis of these colour measures (step 503a). A preferred colour measure is given by a weight function w(spectral_co-ordinates) defined in the spectral system of co-ordinates, so that the colour measure is the average of w(spectral_co-ordinates(pixel)) of all pixels in the segment. The weight function is critical and may be selected for the concrete application. An example of a weight function for an RGB image is a function where the weights on values of intensity (e.g. R+G+B), which are greater than a certain value (light pixels) and smaller than another value (dark pixels), are zero, and the rest of the weights increases linearly along a line in the RGB space. This line defines the colour component which is measured. The weight function may also be selected relatively for the distribution of spectral co-ordinates for the individual segment. In this case, the above-mentioned weight function may be changed so that e.g. 20% of the pixels of the highest intensity and 30% of the pixels of the lowest intensity get the weight zero. The rest of the weights increases linearly along a line in the RGB space.

Texture measures are calculated on each segment (step 502b), and measures characterizing texture measure distributions are calculated on the basis of these texture measures (step 503b). A preferred texture measure is given by a weight function w(spectral_co-ordinates) defined in the spectral system of co-ordinates (like above), so that the texture measure is a distribution measure (others than the average) for the distribution of w(spectral_co-ordinates(pixel)) of all pixels in the segment. Examples of distribution measures are measures based on statistic moments and quantiles. Another preferred texture measure comprises first transforming/filtering each band in the segmented image and then performing a colour measurement like above. Examples of transformations/filterings are the Fourier transformation and the magnitude of it, convolutions and morphological operations.

Segmentation measures are calculated on each segment (step 502c).

The calculated measures may be combined. e.g. so that one measure is normalized with another.

In the measuring procedure, spectral reference samples may be used in the field of vision of the camera, arranged in connection with the integrating cavity 106 on the base or on the sample. This gives two advantages: First, drift of measurements relative to the calibration may be measured, and, second, the impact of the sample (self-illumination) on the light in the integrating cavity may be measured. These measurements may be used for adjusting the spectral alignment specifically for the given measurement.

The colour of the base is particularly important for transparent or semi-transparent samples. In this situation, a spectral homogeneous face is expediently used. Another possibility is that the base is an active light source, e.g. a fibre-optical light plate or a further light source based on an integrating cavity. In the event that the base is an active light source, the proportion between light intensity in the two cavities is an important parameter, and this proportion is controlled e.g. by using the computer, which is connected to both light sources.

An apparatus and a method according to the invention have a large number of applications, which is illustrated by stating some examples. It should be stressed, however, that the applications described are merely given by way of example, as the apparatus and the method may also be used in a large number of other connections.

Classification of fungi directly in e.g. Petri dishes may be mentioned as a first example of an application. The problem is to identify e.g. a fungus and possibly to measure characteristic properties, such as growth rates. Identification takes place today in that a person visually determines the species and/or by performing chemical analysis on metabolites from the fungus. There are many thousands of different fungi, and the nuance differences in the reflections from these fungi are typically very small, which impedes correct determination, and which results in unreliability in the reproduction of determinations made. Some fungi fluoresce. The present invention makes it possible to measure very small nuance differences in a standardized manner, optionally with many spectral bands, including fluorescence. The circumstance that the technique is image-forming provides knowledge of where measurements are made, i.e. the measured colours may be associated with a position relative to e.g. the centre of the fungus. The use of an apparatus and a method according to the invention avoids the subsequent expensive and relatively unreliable chemical analysis, such as HPLC analysis, which is otherwise widely used within this field. For Petri dish vision, the multi-spectral version appears to be the most suitable one, as many fungi today are identified on fluorescence. The combination of this image recording, image calibration, image analysis and reference database can revolutionize this field. It is noted that e.g. food product vision may be performed analogously with Petri dish vision.

Image recording of textiles, such as denim, may be mentioned as a second example. According to the prior art, there are three concrete measurements on denim where the apparatus is essential and can replace inferior reflectometer solutions. Two of them concern stonewash of denim. It is desired that the blue threads are worn (and thus become light). This is called abrasion. However, it is not desired that the blue colour (indigo is more correct than blue) runs into the white colour. This undesired effect is called backstaining. According to the prior art there are no really good measuring methods for determining this effect. Abrasion is typically measured as the reflection at 420 nm (with a reflectometer). Our apparatus can distinguish between the blue and the white threads and thus distinguish between a situation where the white becomes more blue, and a situation where the blue becomes more white. A reflectometer will have difficulty in distinguishing the two effects, but the apparatus described will be able to do precisely this. The last measurement is wear pattern where there is no alternative in the market at the moment. Wear pattern is indicative of how the wear is distributed across the textile.

A third example of the application of an apparatus and a method according to the invention is colour brightness of detergents. Today, detergents frequently contain enzymes which eat worn fibres in the clothes. This effect is measured by the apparatus. This is attempted with varying success with reflectometers according to the prior art. These methods, however, fail in a number of situations as they are not luminous enough for very dark textiles. They cannot cope with textiles having much structure, i.e. much variation in the surface of the object. For example, they have been found unfit for such an important thing as knitwear. Here too, an apparatus according to the invention will be useful.

Some preferred embodiments have been shown in the foregoing, but it should be stressed that the invention is not limited to these, but may be embodied in other ways within the subject-matter defined in the following claims. For example, the so-called integrating ball may have other geometrical shapes than a ball shape; it is possible to use more cameras and more light sources than just a single one; a monochrome camera as well as a colour camera may be used; the camera may be analogue as well as digital; and the camera may be of the line scan camera type which is typically advantageous for quickly moving scenes, or the area scan camera type which is typically advantageous for static scenes.

What is claimed is:

1. An apparatus for recording an image of an object, said apparatus comprising an electronic camera, a calculating unit, one or more light sources, and means for light distribution adapted to distribute light emitted from the light sources and hereby to illuminate the object, light being reflected to the camera, wherein
    the means for the light distribution comprise an integrating cavity whose inner side has light reflective properties, said integrating cavity provided with first and second openings,
    the camera is placed in alignment with the first opening so that the optical axis of the camera extends through the first and second openings,
    the second opening is adapted to receive the object,
    the one or more light sources are mounted so as to illuminate the interior of the integrating cavity,
    said camera is adapted to supply a representation of recorded images to said calculating unit,
    said calculating unit is adapted to perform spectral calibration of said representation, and
    said apparatus comprises two or more spectral calibration objects having known spectral properties for use when performing said spectral calibration, said spectral calibration objects being faces or objects containing one or more areas with known colors and spatially homogenous reflective properties.

2. An apparatus for recording an image of an object, said apparatus comprising an electronic camera, a calculating unit, one or more light sources, and means for light distribution adapted to distribute light emitted from the light sources and hereby to illuminate the object, light being reflected to the camera, wherein
    the means for the light distribution comprise an integrating cavity whose inner side has light reflective properties, said integrating cavity provided with first and second openings,
    the camera is placed in alignment with the first opening so that the optical axis of the camera extends through the first and second openings,
    the second opening is adapted to receive the object,
    the one or more light sources are mounted so as to illuminate the interior of the integrating cavity,
    said camera is adapted to supply a representation of recorded images to said calculating unit,
    said calculating unit is adapted to perform geometrical calibration of said representation, and
    said apparatus comprises one or more geometrical calibration objects having known geometrical properties for use when performing said geometrical calibration, said geometrical calibration objects being faces or objects with a plurality of reference positions having a well-defined mutual positioning.

3. An apparatus according to claim 1 or 2, wherein one or more of the light sources are placed at the integrating cavity so that the light sources emit light directly into the integrating cavity.

4. An apparatus according to claim 1 or 2, wherein one or more of the light sources are placed outside the integrating cavity, and that light is passed into the integrating cavity via light guides.

5. An apparatus according to claim 1 or 2, wherein the camera is fixed relative to the integrating cavity.

6. An apparatus according to claim 1 or 2, comprising a carrier plane on which the object may be placed, and that the integrating cavity and the carrier plane are arranged movably relative to each other.

7. An apparatus according to claim 1 or 2, comprising means for light filtering positioned between the integrating cavity and the camera.

8. An apparatus according to claim 7, wherein at least one means for light filtering is positioned between the light sources and the integrating cavity.

9. An apparatus according to claim 8, wherein said at least one means for light filtering contain a plurality of filters and is adapted to switch between said filters, and said at least one means for light filtering is connected to a second means for light filtering to control filter switching therein.

10. An apparatus according to claim 1 or 2, wherein the one or more calibration objects are positioned in the same or approximately the same plane as the object.

11. An apparatus according to claim 1 or 2, wherein the integrating cavity is ball-shaped or nearly ball-shaped.

12. A method according to claim 1 or 2, wherein the one or more calibration objects are positioned in the same or approximately the same plane as the object.

13. A method of recording an image of an object using an electronic camera, a calculating unit, one or more light sources, and means for light distribution, comprising
- distributing light emitted from the one or more light sources for illuminating the object, light being reflected to the camera,
- using, for the light distribution, an integrating cavity whose inner side has light reflective properties, and which is provided with first and second openings,
- positioning the camera in alignment with the first opening so that the optical axis of the camera extends through the first and second openings,
- receiving the object in the second opening, and
- illuminating the interior of the integrating cavity using the one or more light sources, wherein
- said camera supplies a representation of recorded images to said calculating unit, and
- said calculating unit is adapted to perform, prior to the recording, a spectral calibration of said representation using two or more calibration objects with known spectral properties positioned in the field of vision of the camera, said spectral calibration objects being faces or objects containing one or more areas with known colors and spatially homogenous reflective properties.

14. A method of recording an image of an object using an electronic camera, a calculating unit, one or more light sources, and means for light distribution, comprising
- distributing light emitted from the one or more light sources for illuminating the object, light being reflected to the camera,
- using, for the light distribution, an integrating cavity whose inner side has light reflective properties, and which is provided with first and second openings,
- positioning the camera in alignment with the first opening so that the optical axis of the camera extends through the first and second openings,
- receiving the object in the second opening, and
- illuminating the interior of the integrating cavity using the one or more light sources, wherein
- said camera supplies a representation of recorded images to said calculating unit, and
- said calculating unit is adapted to perform, prior to the recording, a geometrical calibration of said representation using one or more calibration objects with known visual properties positioned in the field of vision of the camera, said geometrical calibration objects being faces or objects with a plurality of reference positions having a well-defined mutual positioning.

15. A method according to claim 13 or 14, wherein light filtering is performed between the integrating cavity and the camera.

16. A method according to claim 13 or 14, wherein light filtering is performed between the light sources and the integrating cavity.

* * * * *